US012580724B2

(12) United States Patent
Brassard

(10) Patent No.: US 12,580,724 B2
(45) Date of Patent: Mar. 17, 2026

(54) WIRELESS TIME PULSE DISTRIBUTION FOR AUTONOMOUS VEHICLES

(71) Applicant: GM Cruise Holdings LLC, San Francisco, CA (US)

(72) Inventor: Joseph Brassard, Somerville, MA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 190 days.

(21) Appl. No.: 18/402,392

(22) Filed: Jan. 2, 2024

(65) Prior Publication Data

US 2025/0219807 A1 Jul. 3, 2025

(51) Int. Cl.
*H04L 7/00* (2006.01)
(52) U.S. Cl.
CPC ................................... H04L 7/0091 (2013.01)
(58) Field of Classification Search
CPC .............................. H04L 7/0091; G04R 20/04
USPC ......................... 375/356, 354, 362, 371, 373
See application file for complete search history.

(56) References Cited

U.S. PATENT DOCUMENTS

2024/0192383 A1* 6/2024 Wang ..................... G04R 20/04

* cited by examiner

*Primary Examiner* — Phuong Phu
(74) *Attorney, Agent, or Firm* — CANTOR COLBURN LLP

(57) ABSTRACT

Systems and techniques are provided for an autonomous vehicle (AV) to select a mobile network. An example method can include establishing a connection between the AV and a mobile device associated with a passenger of the AV; identifying, using the connection, a first mobile network associated with the mobile device; determining that the first mobile network associated with the mobile device is different than a second mobile network associated with the AV; determining, based on a first network indicator associated with the first mobile network and a second network indicator associated with the second mobile network, that the first mobile network is preferable to the second mobile network; and initiating a mobile connection between the AV and the first mobile network.

18 Claims, 5 Drawing Sheets

400

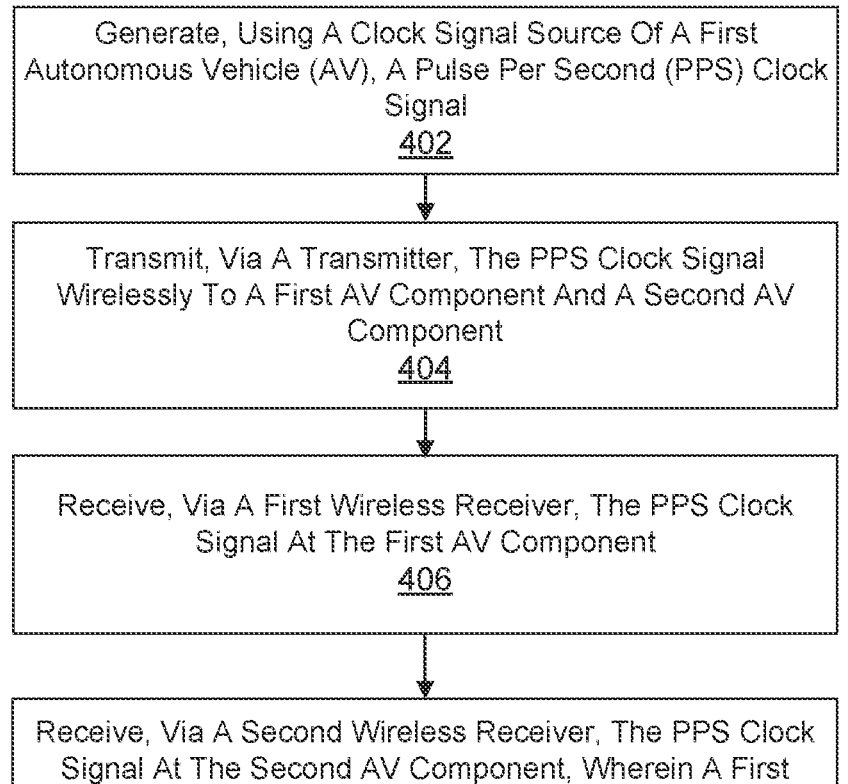

Generate, Using A Clock Signal Source Of A First Autonomous Vehicle (AV), A Pulse Per Second (PPS) Clock Signal
402

Transmit, Via A Transmitter, The PPS Clock Signal Wirelessly To A First AV Component And A Second AV Component
404

Receive, Via A First Wireless Receiver, The PPS Clock Signal At The First AV Component
406

Receive, Via A Second Wireless Receiver, The PPS Clock Signal At The Second AV Component, Wherein A First Digital Communication Associated With The First AV Component Is Synchronized With A Second Digital Communication Associated With The Second AV Component Using The PPS Clock Signal.
408

FIG. 4

WIRELESS TIME PULSE DISTRIBUTION FOR AUTONOMOUS VEHICLES

BACKGROUND

1. Technical Field

The present disclosure generally relates to autonomous vehicles and, more specifically, to systems and techniques for implementing wireless time pulse distribution for autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 4 is a flowchart illustrating an example process for wireless time pulse distribution, in accordance with some examples of the present disclosure.

DETAILED DESCRIPTION

Figure 1:
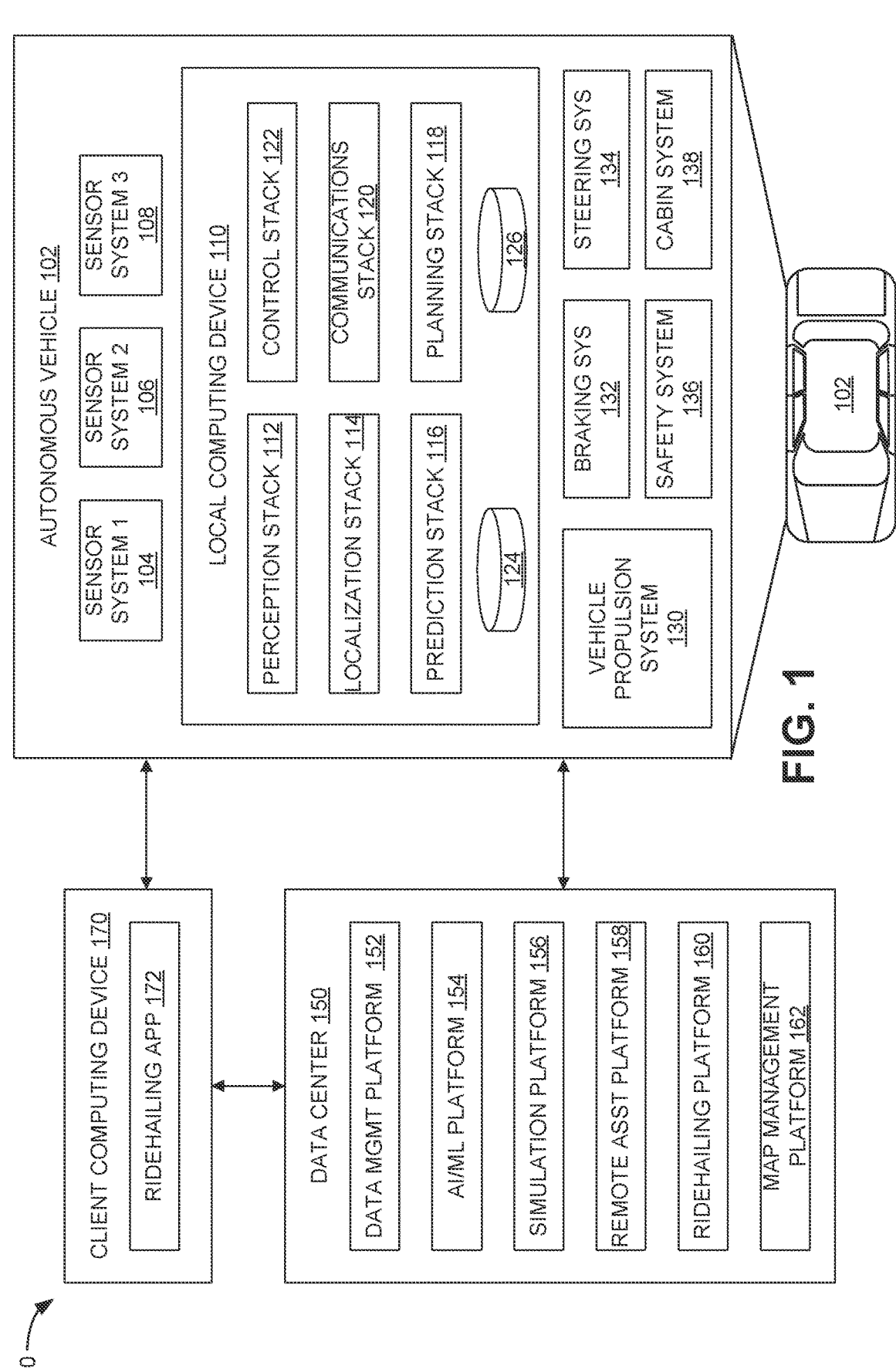
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

Thus, there are many systems, modules, processors, sensors, etc. within an autonomous vehicle that are in communication with each other. The communication protocol used between many of these components can differ. For instance, some components may communicate using Ethernet while others may communicate using Controller Area Network (CAN) bus protocol. Still other components may utilize serial interfaces such as Gigabit Multimedia Serial Link (GMSL).

The use of differing communications protocols among the electronic components in an autonomous vehicle can present significant challenges. For instance, finely synchronized time pulses are needed to align the systems/sensors within the autonomous vehicle. However, synchronization signals (e.g., clock signals) cannot be readily distributed among devices that utilize different communication protocols. Moreover, distribution of a universal clock signal throughout an autonomous vehicle can be difficult due to the cabling cost (e.g., additional harnessing increases cost) and the length of the transmission lines (e.g., transmission line losses, interference, etc.).

Systems and techniques are provided herein for implementing wireless time pulse distribution for autonomous vehicles. In some aspects, a pulse-per-second (PPS) clock signal can be generated by using a reference clock signal such as a signal received from a GNSS disciplined oscillator. In some examples, the PPS clock signal can be filtered and converted into a sinusoidal waveform that can be transmitted to various components within the autonomous vehicle. For example, the wireless PPS clock signal can be transmitted to sensors such as camera sensors, RADAR sensors, LiDAR sensors, etc. In some configurations, components that receive the wireless PPS clock signal can be coupled to a wireless receiver that can include circuitry (e.g., a Schmitt trigger) that can be used to convert the sinusoidal waveform to a square wave. In some implementations, digital communications from the components that use the wireless PPS signal can be synchronized.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridehailing service (e.g., a ridesharing service), a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridehailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridehailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridehailing service via a ridehailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the ridehaling application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
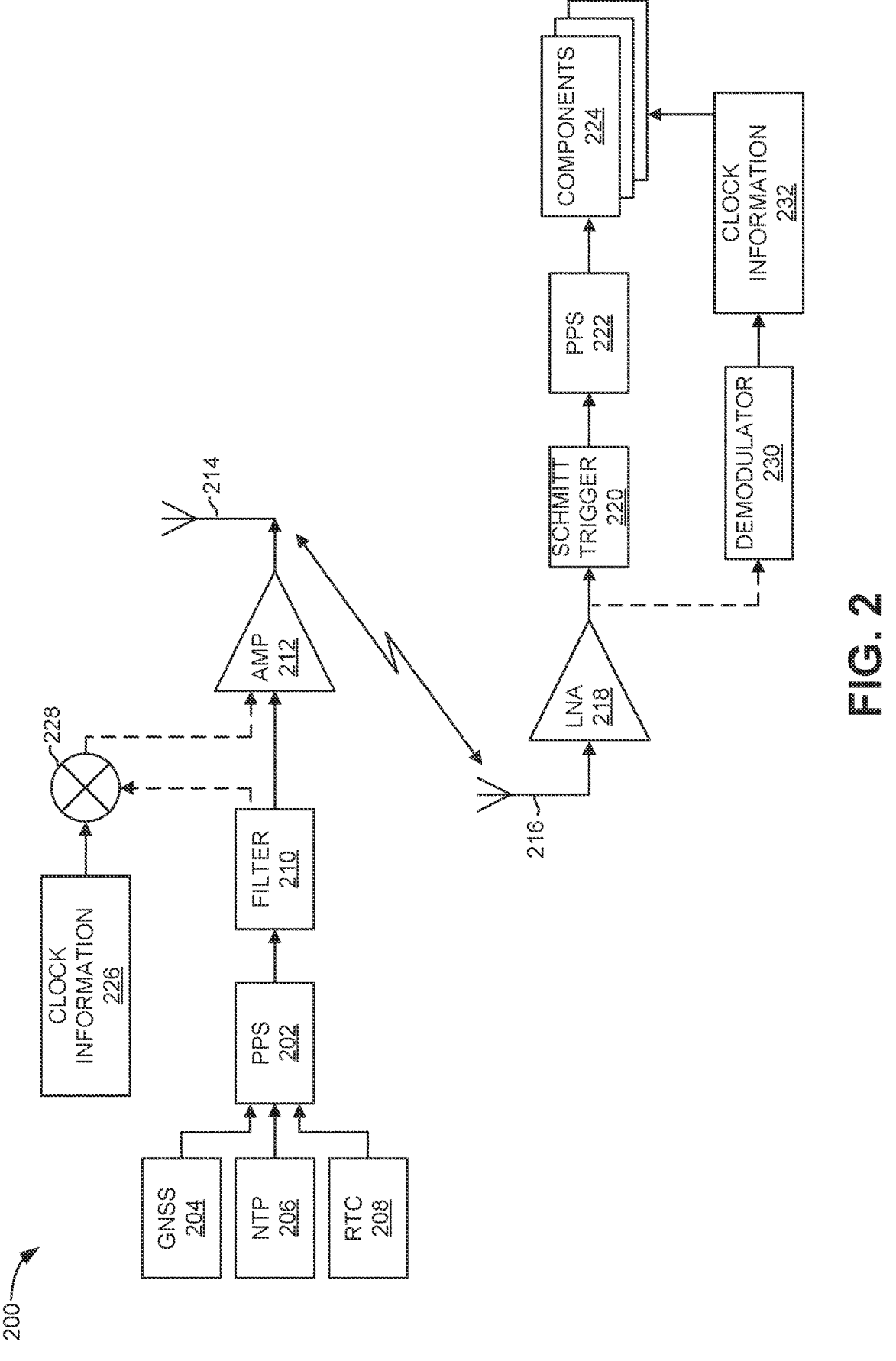
FIG. 2 is a diagram illustrating an example of a system for wireless time pulse distribution, in accordance with some examples of the present disclosure.

FIG. 2 is an example of a system 200 for implementing wireless time pulse distribution, in accordance with some aspects of the present disclosure. In some cases, system 200 can include a pulse per second (PPS) signal generator (e.g., PPS 202). In some examples, PPS 202 can be configured to generate a clock signal that can be used for precise timekeeping and/or time measurement (e.g., by one or more components or systems of an autonomous vehicle such as AV 102). In some configurations, the clock signal generated by PPS 202 can be a square wave (e.g., a transistor-transistor logic (TTL) signal) that includes a high logic level once per second. In some instances, the clock signal generated by PPS 202 can be configured to have different frequencies. In one illustrative example, the frequency of the clock signal from PPS 202 can be less than or equal to 9 kilohertz (kHz). However, those skilled in the art will recognize that PPS 202 can be configured to generate clock signals having any frequency, including frequencies that are greater than 9 KHz.

In some aspects, PPS 202 can have one or more input signals that can be used to generate a clock signal. For example, PPS 202 may generate a clock signal based on a global navigation satellite system (GNSS) 204 input. That is, the clock signal generated by PPS 202 can be based on the output of a GNSS 204 disciplined oscillator. In another example, PPS 202 may generate a clock signal based on a network time protocol (NTP) 206 input. In another example, PPS 202 may generate a clock signal based on a real-time clock (RTC) input (e.g., RTC 208).

As noted above, in some cases, the output of PPS 202 may correspond to a square wave signal. In some examples, system 200 can include one or more filter circuits such as filter 210 that can be used to generate a sinusoidal (e.g., sine) wave. For instance, in some cases filter 210 may include a series of resistor-capacitor (RC) filters that can generate a sinusoidal clock signal having the same or approximately the same frequency as the square wave signal generated by PPS 202.

In some examples, system 200 can include an amplifier (amp 212) that can be used to increase the magnitude (e.g., amplitude, power, etc.) of the PPS clock signal. In some cases, the output of amp 212 can be transmitted using transmit antenna 214. In some cases, transmit antenna 214 may include multiple antennas and/or an antenna array. In some instances, transmit antenna 214 can correspond to an antenna that is integrated with a printed circuit board (PCB). In some aspects, transmit antenna 214 may correspond to an external antenna that can radiate the transmitted signal in one or more directions (e.g., signal may be transmitted directionally or omnidirectionally). For instance, transmit antenna 214 may correspond to a directional antenna that can be configured to perform beamforming in order to transmit the signal in a particular direction.

In some examples, the clock signal transmitted using transmit antenna 214 can be received by one or more components 224 that can use the clock signal for synchronization. In some aspects, components 224 can include any module, system, processor, sensor, and/or electronic device that can receive a clock signal. In one illustrative example, components 224 can include AV components such as sensor systems 104-108, local computing device 110, and/or any other AV component.

In some configurations, components 224 can be associated with one or more circuits that can be used to receive the wireless clock signal that is transmitted via transmit antenna 214. For example, components 224 can be coupled to a receive antenna 216 that can be tuned to receive one or more frequencies associated with the wireless clock signal. As noted with respect to transmit antenna 214, receive antenna 216 can include an integrated antenna (e.g., an "intenna"), an antenna array, a directional antenna, and/or any other suitable antenna configuration.

In some aspects, the receive antenna 216 may be coupled to a low-noise amplifier (LNA) 218 that can be used to increase the magnitude of the received signal. In some examples, the output of the LNA 218 may be coupled to a comparator circuit such as Schmitt trigger 220 that can be used to receive a sinusoidal wave and generate a square wave. In some aspects, the output of Schmitt trigger 220 may correspond to a square wave clock signal having a frequency that is the same as the clock signal generated by PPS 202. That is, PPS 222 can correspond to a square wave clock signal having the same frequency as the clock signal generated by PPS 202, which can be used to synchronize communications among two or more electronic components.

Although system 200 is illustrated as having a single transmitter and a single receiver that is coupled to components 224, it will be understood by those skilled in the art that each of components 224 may be associated with separate receiver circuits. That is, in some cases a single wireless receiver may be used to receive the clock signal and distribute it to multiple components 224, while in other examples one or more of components 224 may be coupled to distinct circuits for receiving the wireless clock signal.

In some examples, system 200 may include a modulator 228 that can be used to modulate one or more signals onto the wireless clock signal. For instance, modulator 228 can be used to modulate a clock information 226 signal onto the wireless clock signal. In some cases, clock information 226 may include information regarding the frequency of the clock signal. For instance, clock information 226 may be used to communicate an upcoming change in the clock frequency. For example, clock information 226 can include a bit sequence that identifies a clock frequency which can then be used by a receiving component or circuit to tune the receiver and synchronize the clock signal.

In some configurations, system 200 can include a demodulator 230 that can be used to demodulate the transmitted clock signal to extract data that is modulated thereon. For instance, demodulator 230 can be used to obtain clock information 232 (e.g., which corresponds clock information 226). As noted above, clock information 232 can include information relating to the transmitted clock signal. For instance, clock information 232 may inform components 224 of an upcoming change in the frequency of the clock signal.

Figure 3:
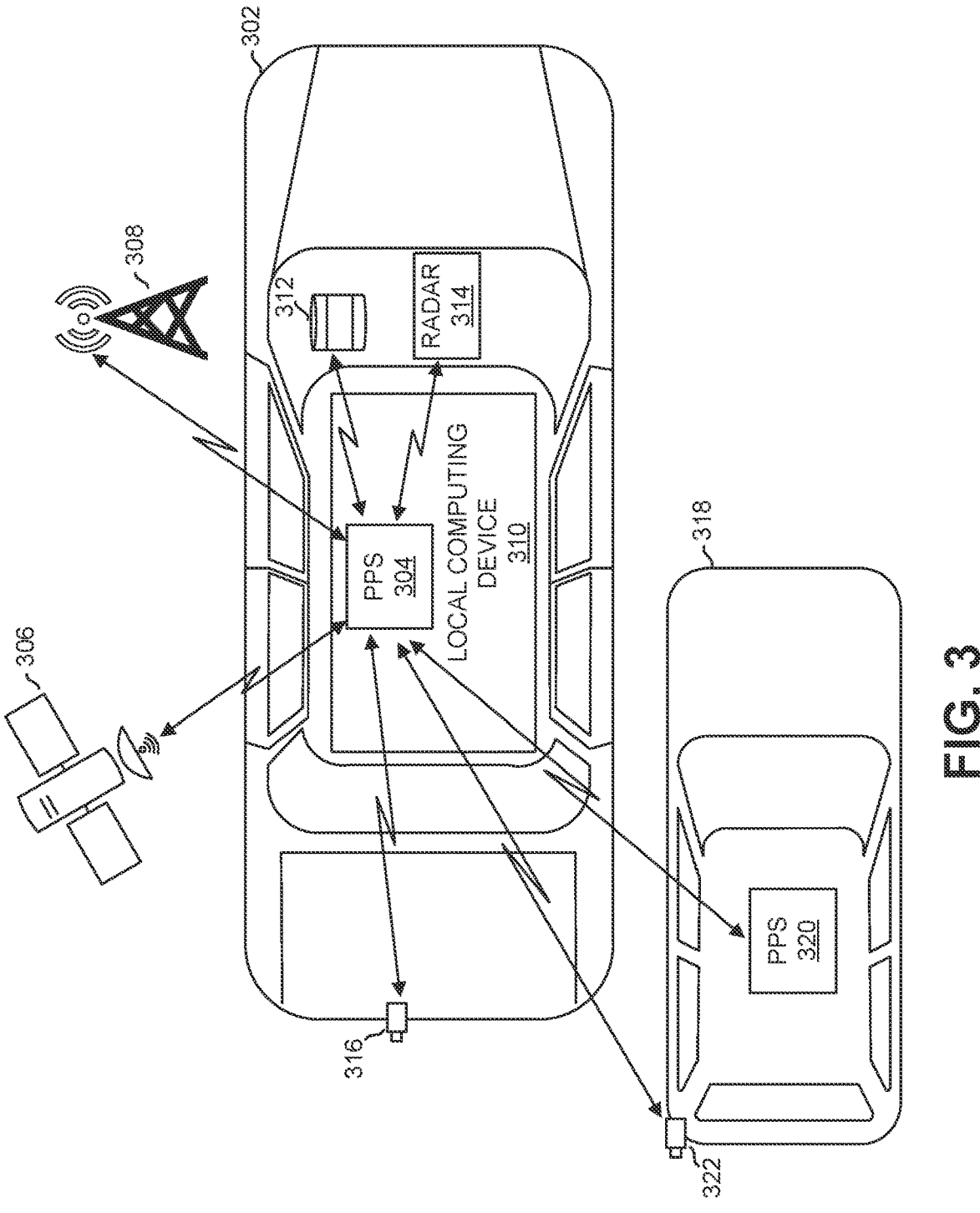
FIG. 3 is a diagram illustrating an example of a system for wireless time pulse distribution for autonomous vehicles, in accordance with some examples of the present disclosure.

FIG. 3 is an example of a system 300 for wireless time pulse distribution for autonomous vehicles (AVs). In some aspects, system 300 can include AV 302 and AV 318. In some examples, AV 302 and AV 318 may correspond to AV 102. In some cases, AV 302 may include a local computing device 310 which may correspond to local computing device 110. In some aspects, local computing device 310 may include or be coupled to one or more components that can be used to transmit and/or receive a wireless clock signal. That is, local computing device 310 may include or be coupled to one or more of the components from system 200 as described in connection with FIG. 2.

As illustrated, local computing device 310 includes PPS 304. In some cases, PPS 304 may include components for generating and transmitting a wireless clock signal. For instance, PPS 304 may include PPS 202, filter 210, AMP 212, transmit antenna 214, modulator 228, and/or any other component/device that may be used for generating and transmitting a wireless clock signal. In some configurations, PPS 304 may generate a wireless clock signal that is based on a GNSS signal (e.g., GNSS disciplined oscillator) received from satellite 306. In some instances, PPS 304 may generate a wireless clock signal that is based on an NTP signal received from a base station such as base station 308 and/or any other network access point (e.g., cellular network, Wi-Fi network, etc.) that may be in communication with AV 302.

In some examples, PPS 304 may transmit a wireless clock signal to one or more components of AV 302. For example, PPS 304 may transmit a wireless clock signal to LiDAR sensor 312, RADAR 314, and/or camera 316. In some configurations, components that are configured to receive a wireless clock signal (e.g., LiDAR sensor 312, RADAR 314, and/or camera 316) may be coupled to a wireless receiver. For instance, LiDAR sensor 312, RADAR 314, and/or camera 316 can be coupled to components such as receive antenna 216, LNA 218, Schmitt trigger 220, demodulator 230, and/or any other component/device that may be used for receiving a wireless clock signal.

In some aspects, the wireless clock signal that is distributed to components of AV 302 can be used to synchronize communications among two or more components.

For example, local computing device 310 may receive sensor data from LiDAR sensor 312 and from RADAR 314 that can be synchronized because local computing device 310 is using the same clock signal as LiDAR sensor 312 and RADAR 314.

In some cases, the wireless clock signal that is generated by AV 302 can be transmitted to one or more other AVs such as AV 318. In some examples, inter-AV interference can be reduced by having AVs synchronized to the same clock signal. For example, sensor measurements by AV 302 may interfere with sensor measurements of AV 318 if the AVs are not synchronized. Such interference may be more significant in areas that have high AV congestion (e.g., an AV depot).

In some instances, AVs may synchronize clock signals when the AVs are located in environments that have limited GNSS connectivity and/or limited network connectivity for obtaining reference clock signal (e.g., parking garage, urban canyon, tunnel, etc.). That is, AV clock signals may drift in the absence of GNSS connectivity which may increase the risk of interference with neighboring AVs.

In some examples, AV 302 can have priority and be selected as the "master" with respect to the clock signal among AV 302 and AV 318. That is, AV 302 can transmit a wireless clock signal that is used by AV 318. Such an election or designation of master versus slave can be made through communications between AV 302 and AV 318 using any suitable protocol (e.g., WiFi, cellular, V2X, Bluetooth®, etc.). In some cases, the priority can be based on a default setting such as the AV having the lowest VIN number. In some aspects, the AV "master" can be determined via communication with a fleet management server (e.g., data center 150). Further, while system 300 is illustrated as having two AVs, those skilled in the art will recognize that a wireless clock signal transmitted by an AV may be used by multiple AVs.

In some aspects, the wireless clock signal transmitted by AV 302 can be received by PPS 320 within AV 318 and subsequently distributed among other components within AV 318. Alternatively, in some configurations, the wireless clock signal transmitted by AV 302 may be received by multiple components within AV 318. For instance, camera 322 may receive the wireless clock signal transmitted by AV 302.

In some examples, different AVs can be configured to use different clock frequencies. In some cases, the clock frequencies may be allocated based on the geographic region in which the AVs operate. For instance, two sets of AVs can be allocated the same set of frequencies because they operate in different geographic regions. In one illustrative example, AV 302 and AV 318 may operate in the same geographic region, and AV 302 can be configured to use an 8.5 kHz clock signal and AV 318 can be configured to use an 8 kHz clock signal. In some aspects, AV 318 can temporarily synchronize to the clock signal from AV 302 and utilize an 8.5 kHz clock signal. In some cases, the frequency of the master clock signal can be communicated by modulating clock information (e.g., clock information 226) onto the transmitted clock signal. In some instances, AVs may communicate the frequency of the clock signal using WiFi, cellular, Bluetooth, etc.

FIG. 4 illustrates an example of a process 400 for wireless time pulse distribution. Although the process 400 depicts a particular sequence of operations, the sequence may be altered without departing from the scope of the present disclosure. For example, some of the operations depicted may be performed in parallel or in a different sequence that does not materially affect the function of process 400. In other examples, different components of an example device or system that implements process 400 may perform functions at substantially the same time or in a specific sequence.

At step 402, the process 400 includes generating, using a clock signal source of a first autonomous vehicle (AV), a pulse per second (PPS) clock signal. In some aspects, the clock signal source is configured to generate the PPS clock signal based on an output from a global navigation satellite system (GNSS) disciplined oscillator. For example, PPS 304 can generate a PPS clock signal using a clock signal from satellite 306 or from base station 308. In some examples, the frequency of the PPS clock signal can be less than or equal to 9 kHz.

At step 404, the process 400 includes transmitting, via a transmitter, the PPS clock signal wirelessly to a first AV component and a second AV component. For instance, PPS 304 can include components such as filter 210, AMP, 212, and/or transmit antenna 214 that can be used to transmit the PPS clock signal wirelessly to LiDAR sensor 312 and RADAR 314.

At step 406, the process 400 includes receiving, via a first wireless receiver, the PPS clock signal at the first AV component. For example, LiDAR sensor 312 can include components such as receive antenna 216, LNA 218, and/or Schmitt trigger 220 for receiving the wireless clock signal.

At step 408, the process 400 includes receiving, via a second wireless receiver, the PPS clock signal at the second AV component, wherein a first digital communication associated with the first AV component is synchronized with a second digital communication associated with the second AV component using the PPS clock signal. For instance, RADAR 314 can include components such as receive antenna 216, LNA 218, and/or Schmitt trigger 220 for receiving the wireless clock signal. In some aspects, data from RADAR 314 and LiDAR sensor 312 can be synchronized based on the PPS clock signal.

In some examples, the process 400 can include generating a sinusoidal PPS clock signal using at least one filter circuit that is coupled to an output of the clock signal source. For instance, filter 210 can be used to generate a sinusoidal PPS clock signal.

In some instances, the process 400 can include converting the sinusoidal PPS clock signal into a square wave PPS clock signal using at least one comparator that is coupled to the first wireless receiver. For example, Schmitt trigger 220 can be used to convert the sinusoidal PPS clock signal into a square wave PPS clock signal.

In some aspects, the process 400 can include modulating a clock information signal onto the PPS clock signal. For instance, modulator 228 can be used to modulate clock information 226 onto the PPS clock signal.

In some examples, the process 400 can include transmitting, via the transmitter, the PPS clock signal wirelessly to a third AV component, wherein the third AV component is associated with a second AV. For instance, AV 302 can transmit the PPS clock signal to camera 322 that is associated with AV 318.

Figure 5:
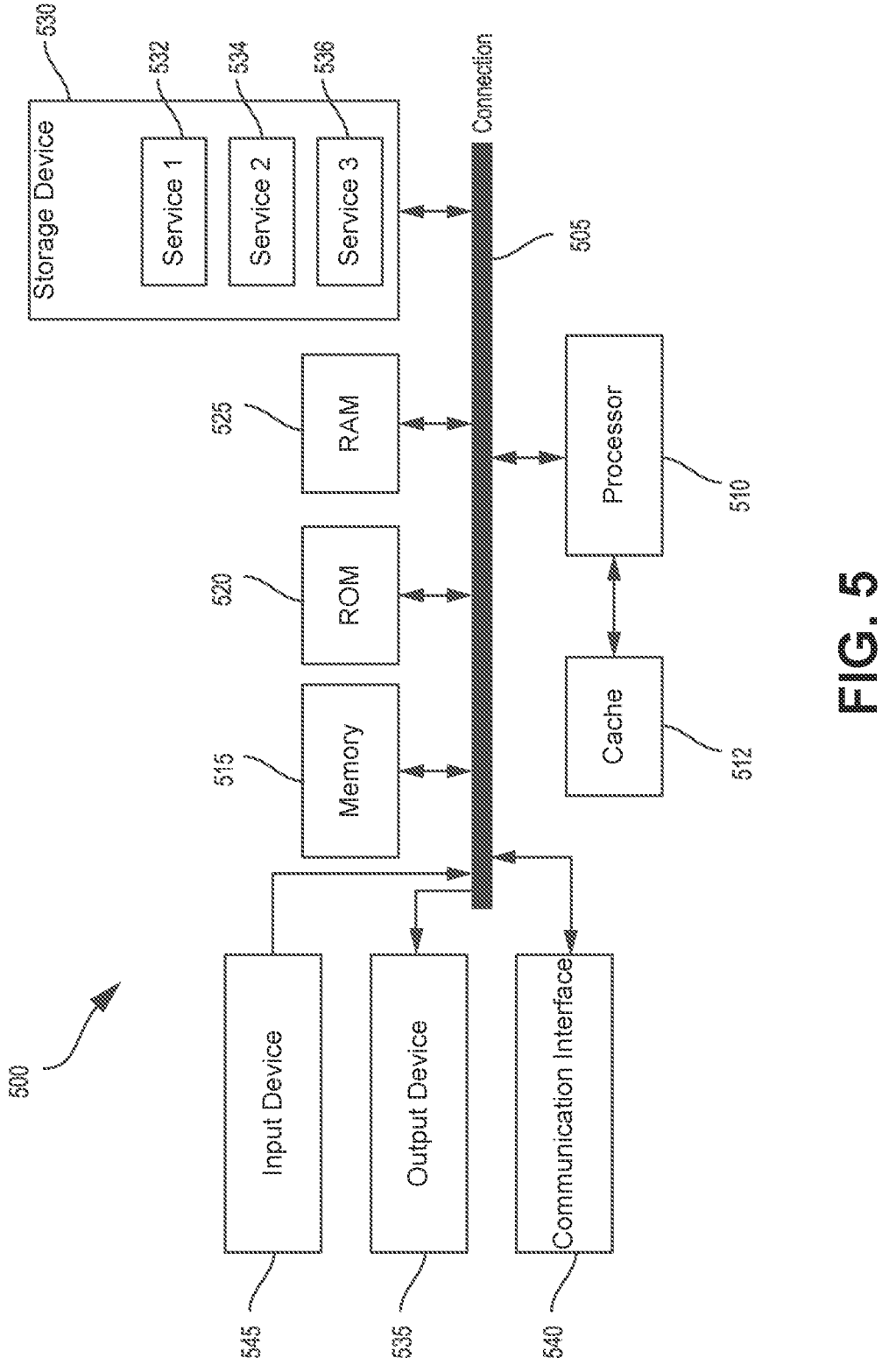
FIG. 5 is a diagram illustrating an example system architecture for implementing certain aspects described herein.

FIG. 5 illustrates an example processor-based system with which some aspects of the subject technology can be implemented. For example, processor-based system 500 can be any computing device making up internal computing system 110, a passenger device executing the ridehailing application 172, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 can include an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning™ port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ultra-wideband (UWB) wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540) may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530) can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, causes the system to perform a function. In some examples, a hardware service that performs a particular function can include the software component stored in a computer-readable medium in connection with the necessary hardware components, such as processor 510, connection 505, output device 535, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

SELECTED EXAMPLES

Illustrative examples of the disclosure include:

Aspect 1. A method comprising: generating, using a clock signal source of a first autonomous vehicle (AV), a pulse per second (PPS) clock signal; transmitting, via a transmitter, the PPS clock signal wirelessly to a first AV component and a second AV component; receiving, via a first wireless receiver, the PPS clock signal at the first AV component; and receiving, via a second wireless receiver, the PPS clock signal at the second AV component, wherein a first digital communication associated with the first AV component is synchronized with a second digital communication associated with the second AV component using the PPS clock signal.

Aspect 2. The method of Aspect 1, further comprising: generating a sinusoidal PPS clock signal using at least one filter circuit that is coupled to an output of the clock signal source.

Aspect 3. The method of Aspect 2, further comprising: converting the sinusoidal PPS clock signal into a square wave PPS clock signal using at least one comparator that is coupled to the first wireless receiver.

Aspect 4. The method of any of Aspects 1 to 3, wherein the clock signal source is configured to generate the PPS clock signal based on an output from a global navigation satellite system (GNSS) disciplined oscillator.

Aspect 5. The method of any of Aspects 1 to 4, wherein a frequency of the PPS clock signal is less than or equal to 9 kilohertz (kHz).

Aspect 6. The method of any of Aspects 1 to 5, wherein the first AV component corresponds to an AV processor and the second AV component corresponds to an AV sensor.

Aspect 7. The method of any of Aspects 1 to 6, further comprising: modulating a clock information signal onto the PPS clock signal.

Aspect 8. The method of any of Aspects 1 to 7, further comprising: transmitting, via the transmitter, the PPS clock signal wirelessly to a third AV component, wherein the third AV component is associated with a second AV.

Aspect 9. An apparatus comprising: at least one memory; and at least one processor coupled to the at least one memory, wherein the at least one processor is configured to perform operations in accordance with any one of Aspects 1 to 8.

Aspect 10. An apparatus comprising means for performing operations in accordance with any one of Aspects 1 to 8.

Aspect 11. A non-transitory computer-readable medium comprising instructions that, when executed by an apparatus, cause the apparatus to perform operations in accordance with any one of Aspects 1 to 8.

Aspect 12. An apparatus comprising: a clock signal source configured to generate a pulse per second (PPS) clock signal; at least one filter circuit coupled to an output of the clock signal source, wherein the at least one filter circuit is configured to filter the PPS clock signal to yield a sinusoidal PPS clock signal; and a wireless transmitter coupled to the at least one filter circuit, wherein the wireless transmitter is configured to transmit the sinusoidal PPS clock signal.

Aspect 13. The apparatus of Aspect 12, wherein the clock signal source is configured to generate the PPS clock signal based on an output from a global navigation satellite system (GNSS) disciplined oscillator.

Aspect 14. The apparatus of any of Aspects 12 to 13, further comprising: a modulator circuit that is disposed between the clock signal source and the wireless transmitter, wherein the modulator circuit is configured to modulate a clock information signal onto the sinusoidal PPS clock signal.

Aspect 15. The apparatus of any of Aspects 12 to 14, wherein a frequency of the PPS clock signal is less than or equal to 9 kilohertz (KHz).

Aspect 16. The apparatus of any of Aspects 12 to 15, wherein the apparatus is part of an autonomous vehicle.

Aspect 17. An apparatus comprising: a clock signal source configured to generate a pulse per second (PPS) clock signal; a wireless transmitter configured to transmit the PPS clock signal to a first component and a second component; a first wireless receiver coupled to the first component, wherein the first wireless receiver is configured to receive the PPS clock signal that is provided to the first component; and a second wireless receiver coupled to the second component, wherein the second wireless receiver is configured to receive the PPS clock signal that is provided to the second component.

Aspect 18. The apparatus of Aspect 17, further comprising: at least one filter circuit that is disposed between the clock signal source and the wireless transmitter, wherein the at least one filter circuit is configured to generate a sinusoidal PPS clock signal.

Aspect 19. The apparatus of Aspect 18, further comprising: at least one comparator circuit that is disposed between the first wireless receiver and the first component, wherein the at least one comparator circuit is configured to convert the sinusoidal PPS clock signal into a square wave PPS clock signal.

Aspect 20. The apparatus of any of Aspects 17 to 19, wherein a digital communication between the first component and the second component is synchronized using the PPS clock signal.

Aspect 21. The apparatus of any of Aspects 17 to 20, wherein the clock signal source is configured to generate the PPS clock signal based on an output from a global navigation satellite system (GNSS) disciplined oscillator.

Aspect 22. The apparatus of any of Aspects 17 to 21, wherein a frequency of the PPS clock signal is less than or equal to 9 kilohertz (kHz).

Aspect 23. The apparatus of any of Aspects 17 to 22, wherein the apparatus corresponds to an autonomous vehicle (AV), and wherein the first component corresponds to an AV processor and the second component corresponds to an AV sensor.

Aspect 24. The apparatus of any of Aspects 17 to 23, further comprising: a modulator circuit that is disposed between the clock signal source and the wireless transmitter, wherein the modulator circuit is configured to modulate a clock information signal onto the PPS clock signal.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An autonomous vehicle (AV) comprising:
a clock signal source configured to generate a pulse per second (PPS) clock signal;
a wireless transmitter configured to transmit the PPS clock signal to a first AV component and a second AV component;
a first wireless receiver coupled to the first AV component, wherein the first wireless receiver is configured to receive the PPS clock signal that is provided to the first AV component;
a second wireless receiver coupled to the second AV component, wherein the second wireless receiver is configured to receive the PPS clock signal that is provided to the second AV component; and
at least one filter circuit that is disposed between the clock signal source and the wireless transmitter, wherein the at least one filter circuit is configured to generate a sinusoidal PPS clock signal.

2. The AV of claim 1, further comprising:
at least one comparator circuit that is disposed between the first wireless receiver and the first AV component, wherein the at least one comparator circuit is configured to convert the sinusoidal PPS clock signal into a square wave PPS clock signal.

3. The AV of claim 1, wherein a digital communication between the first AV component and the second AV component is synchronized using the PPS clock signal.

4. The AV of claim 1, wherein the clock signal source is configured to generate the PPS clock signal based on an output from a global navigation satellite system (GNSS) disciplined oscillator.

5. The AV of claim 1, wherein a frequency of the PPS clock signal is less than or equal to 9 kilohertz (kHz).

6. The AV of claim 1, wherein the first AV component corresponds to an AV processor and the second AV component corresponds to an AV sensor.

7. The AV of claim 1, further comprising:
a modulator circuit that is disposed between the clock signal source and the wireless transmitter, wherein the modulator circuit is configured to modulate a clock information signal onto the PPS clock signal.

8. A method comprising:
generating, using a clock signal source of a first autonomous vehicle (AV), a pulse per second (PPS) clock signal;
transmitting, via a transmitter, the PPS clock signal wirelessly to a first AV component and a second AV component;
receiving, via a first wireless receiver, the PPS clock signal at the first AV component;
receiving, via a second wireless receiver, the PPS clock signal at the second AV component, wherein a first digital communication associated with the first AV component is synchronized with a second digital communication associated with the second AV component using the PPS clock signal; and generating a sinusoidal PPS clock signal using at least one filter circuit that is coupled to an output of the clock signal source.

9. The method of claim 8, further comprising:

converting the sinusoidal PPS clock signal into a square wave PPS clock signal using at least one comparator that is coupled to the first wireless receiver.

10. The method of claim 8, wherein the clock signal source is configured to generate the PPS clock signal based on an output from a global navigation satellite system (GNSS) disciplined oscillator.

11. The method of claim 8, wherein a frequency of the PPS clock signal is less than or equal to 9 kilohertz (kHz).

12. The method of claim 8, wherein the first AV component corresponds to an AV processor and the second AV component corresponds to an AV sensor.

13. The method of claim 8, further comprising:

modulating a clock information signal onto the PPS clock signal.

14. The method of claim 8, further comprising:

transmitting, via the transmitter, the PPS clock signal wirelessly to a third AV component, wherein the third AV component is associated with a second AV.

15. An apparatus comprising:

a clock signal source configured to generate a pulse per second (PPS) clock signal; at least one filter circuit coupled to an output of the clock signal source, wherein the at least one filter circuit is configured to filter the PPS clock signal to yield a sinusoidal PPS clock signal; and a wireless transmitter coupled to the at least one filter circuit, wherein the wireless transmitter is configured to transmit the sinusoidal PPS clock signal.

16. The apparatus of claim 15, wherein the clock signal source is configured to generate the PPS clock signal based on an output from a global navigation satellite system (GNSS) disciplined oscillator.

17. The apparatus of claim 15, further comprising:

a modulator circuit that is disposed between the clock signal source and the wireless transmitter, wherein the modulator circuit is configured to modulate a clock information signal onto the sinusoidal PPS clock signal.

18. The apparatus of claim 15, wherein a frequency of the PPS clock signal is less than or equal to 9 kilohertz (kHz).

* * * * *